US008326746B1

(12) United States Patent
Crawford et al.

(10) Patent No.: US 8,326,746 B1
(45) Date of Patent: Dec. 4, 2012

(54) SYSTEM AND METHOD FOR EVALUATING IDIOSYNCRATIC RISK FOR CASH FLOW VARIABILITY

(75) Inventors: Gordon Crawford, Washington, DC (US); William Schultz, Washington, DC (US); Mingchao Chen, Washington, DC (US); Brian Burk, Washington, DC (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 12/146,268

(22) Filed: Jun. 25, 2008

Related U.S. Application Data

(60) Provisional application No. 60/937,131, filed on Jun. 26, 2007.

(51) Int. Cl.
*G06Q 40/00* (2006.01)
(52) U.S. Cl. ............................................. 705/38; 705/35
(58) Field of Classification Search .................. None
See application file for complete search history.

(56) References Cited

U.S. PATENT DOCUMENTS

| | | | |
|---|---|---|---|
| 2003/0048906 A1* | 3/2003 | Vora et al. ...................... | 380/277 |
| 2004/0073508 A1* | 4/2004 | Foster et al. .................... | 705/38 |
| 2006/0143099 A1* | 6/2006 | Partlow et al. .................. | 705/35 |
| 2006/0253360 A1* | 11/2006 | Gould .............................. | 705/35 |
| 2009/0006267 A1* | 1/2009 | Fergusson et al. .......... | 705/36 R |

OTHER PUBLICATIONS

"Limits of Arbitrage: Theory and Evidence from the Mortgage-Back Securities Market" by Gabaix et al. at www.afajof.org/afa/forthcoming/2029.pdf p. 1-45, Apr. 28, 2006.*
"Systematic and Idiosyncratic Risk in Middle-Market Default Prediction: A Study of the Performance of the RiskCalc and PFM Models" by Stein et al. pp. 1-40 : Feb 2003, at www.moodyskmv.com/research/files/wp/RiskCalc_PFM.pdf.*
Bank of England Quarterly Bulletin, Spring 2001 : vol. 41 No. 1 ; pp. 141.*
Deloitte & Touche LLP, FASB Interpretation. No. 46 Consolidation of Variable Interest Entities, A Roadmap to Applying the New Consolidation Guidance, Dec. 2003, 108 pages.*
Chan-Lau, Jorge A. and Lu, Yinqiu, Idiosyncratic and Systemic Risk in the European Corporate Sector: A Cdo Perspective (May 2006). IMF Working Papers, vol. , pp. 1-18, 2006. Available at SSRN: http://ssrn.com/abstract=910672.*
Corinna C Petry. (Jun. 2007). Mortgage Tsunami. Collections & Credit Risk, 12(6), 25-28. Retrieved Oct. 9, 2009, from Banking Information Source. (Document ID: 1285093531).*
Commercial Mortgage Workout Strategy and Conditional Default Probability: Evidence from special Serviced CMBS Loans by Jen Chen: property and Portfolio Research, Inc; 40 Court Street 3rd floor, Boston, MA—44 pages at http://www.reri.org/research/article_pdf/wp120.pdf.*

(Continued)

*Primary Examiner* — Elizabeth Rosen
*Assistant Examiner* — Mary Gregg
(74) *Attorney, Agent, or Firm* — Foley & Lardner LLP

(57) ABSTRACT

A Monte Carlo simulation engine configured to perform a primary beneficiary test to determine whether a variable interest entity holder is a primary beneficiary of a financial instrument. The engine includes a cash flow engine configured to generate a set of default/prepayment curves representing one or more discrete cash flow scenarios for one or more loans for the financial instrument, the default/prepayment curves representative of systemic risk associated with the financial instrument. The engine further includes an idiosyncratic risk module configured to convert the set of default/prepayment curves defined by the cash flow engine into a number of occurrences, which, at an aggregated level, mimic the default/prepayment curve from a systemic risk model.

20 Claims, 5 Drawing Sheets

OTHER PUBLICATIONS

Cross-sectional Variation in Stock Returns: Liquidity and Idiosyncratic Risk; Matthew Spiegel and Xiaotong Wang; Sep. 8, 2005; 62 pages at finance.wharton.upenn.edu/department/Seminar/2005Fall/microFall2005/spiegel-micro-091505.pdf.*

Idiosyncratic Risk, systematic risk and Stochastic Volatility: An Implementation of Merton's Credit Risk Valuation by Hayette Gatfaoui; Sep. 2003; University of Paris I; Boulevard De L Hopital; http://129.3.20.41/eps/fin/papers/0404/0404004.pdf; 32 pages.*

Subprime Mortgages: AustinHomeLoan.com 2 pages; May 16, 2000 @ austinhomeloan.com/programs/subprime1.html.*

Sell Your Home Faster with Seller Financing by Jame MacArthur; 3 pages.*

JMAC Funding: Seller Financing Tips for Creating Seller Carryback seller carryback 2nds; 3 pages copyright 2006.*

* cited by examiner

SYSTEM AND METHOD FOR EVALUATING IDIOSYNCRATIC RISK FOR CASH FLOW VARIABILITY

CROSS-REFERENCE TO RELATED PATENT APPLICATIONS

This application claims the benefit of U.S. Provisional Application No. 60/937,131, entitled "System and method for evaluating idiosyncratic risk for cash flow variability" filed Jun. 26, 2007, incorporated herein by reference in its entirety.

BACKGROUND

The present invention relates to the field of accounting for financial instruments, such as mortgage backed securities, asset backed securities, and related systems and methods, in which securities are backed by loans which provides loan funds to borrowers, and the borrowers are obligated to repay the loan funds over time by way of a series of loan payments.

Multifamily housing is housing that is subdivided into a number of independent units occupied by people, herein referred to as residents. The number of units in a multifamily housing property can vary from a relatively small number of units, to a relatively large number of units, such as in an apartment building having hundreds of units.

Because of the amount of money involved in purchasing multifamily property, most potential purchasers do not purchase the multifamily housing property outright. Rather, lenders, such as banks, mortgage lenders, and so on, offer multifamily mortgage products to potential multifamily property purchasers. A multifamily mortgage product generally comprises a lender's obligation in which the lender (mortgagor) commits to provide loan funds sufficient to purchase the multifamily property and a borrower's obligation in which the borrower (purchaser, mortgagee) commits in exchange to repay the loan funds by way of a series of loan payments. If the borrower fails to repay the loan funds, the lender has a legal claim against the multifamily property which allows the lender to sell the property and use the proceeds to pay off the loan balance (foreclosure). The mortgage product therefore allows the borrower to purchase the multifamily property and pay for the multifamily property over time, while also ensuring that the lender is repaid. In the multi-family loan area, loans are generally much larger.

A multifamily loan holder or multifamily loan purchaser may create mortgage backed securities (MBS) as part of an MBS execution, or create other financial instruments or assets that are collateralized by cash flows associated with the multifamily loans, including both loans that have been purchased by the purchaser and other loans that have not been purchased by the purchaser. For example, in the case of an MBS, the purchaser may acquire a pool of loans, securitize the pool of loans to create the MBS that is then sold to investors, and hold the pool of loans in trust for the benefit of the investors. The size of the pool of loans may be large or small and may depend in part on the amount of the underlying loan or loans. For example, for an MBS backed by a multi-family loan, the number of loans in the pool may be relatively small (often a single loan) because of the large loan amount of the multifamily loan.

Purchasers, guarantors, investors, and/or lenders associated with mortgage backed securities may be subject of accounting rules that address how their financial assets must be recorded in their financial statements. Financial Accounting Standards Board (FASB) Interpretation Number (FIN) 46 is an interpretation of accounting research bulletin No. 51, December 2003 regarding consolidation of variable interest entities that requires consolidation of securities that are not qualified special purpose entities and for which an entity bears the principal risk of loss, i.e., for which an entity is the primary beneficiary. Consolidation includes the process of recording the assets, liabilities, and equity of the entity on a primary beneficiary's financial statements.

FIN 46 requires that an entity make a determination whether the entity bears the principal risk of loss (i.e., whether the entity is the primary beneficiary). Based on historical data, 5% of these loans will fail, creating variability in the cash flow resulting from these loans. If a guarantor absorbs more that a predetermined amount of the total variability for a security, the security may be consolidated under FIN 46 on its balance sheet.

What is needed is a system and method to implement a quantitative method that properly allocates risk among parties that are beneficiaries to a multifamily MBS. What is further needed is such a system and method configure to identify both systemic and idiosyncratic risk in implementing the quantitative method. However, it should be understood that the techniques described and claimed herein may also be applied to meet other needs instead of or in addition to the above needs.

SUMMARY

One embodiment of the invention relates to a Monte Carlo simulation engine configured to perform a primary beneficiary test to determine whether a variable interest entity holder is the primary beneficiary of a financial instrument. The engine includes a cash flow engine configured to generate a set of default/prepayment curves representing one or more discrete cash flow scenarios for one or more loans for the financial instrument, the default/prepayment curves representative of systemic risk associated with the financial instrument. The engine further includes an idiosyncratic risk module configured to convert the set of default/prepayment curves defined by the cash flow engine into a number of occurrences, which, at an aggregated level, mimic the default/prepayment curve from a systemic risk model.

Another embodiment of the invention relates to a method for determining whether an idiosyncratic risk adjusted variability for a first party associated with a plurality of cash flows is large enough in comparison to other interested parties such that an asset or a Committee on Uniform Security Identification Procedures (CUSIP) needs to be consolidated under FIN 46. The method includes generating a set of default/prepayment curves representing one or more discrete cash flow scenarios for one or more loans for a financial instrument, the default/prepayment curves representative of systemic risk associated with the multifamily mortgage backed security and converting the set of default/prepayment curves defined by the cash flow engine based on idiosyncratic risk associated with the one or more loans for the financial instrument.

Another embodiment of the invention relates to a method for accounting for idiosyncratic risk by a qualitative and quantitative assessment of a financial instrument to determine a share of total risk owned by a party having an interest in the financial instrument. The method includes determining whether the financial instrument qualifies as a qualified special purpose entity based on ownership of a trust underlying the financial instrument. A determination of whether the investment qualifies as a guaranteed mortgage security and determining whether the party having an interest in the financial instrument is the primary beneficiary of the financial instrument can also be made. The primary beneficiary determination includes generating a plurality of systemic cash flows representing systemic risk associated with the multifamily mortgage backed security, identifying four systemic cash flow paths from the plurality of systemic cash flows, generating a plurality of idiosyncratic risk paths for each of the four systemic cash flow paths, where an aggregation of the risk paths replicates the default curves and the prepayment curve for that systemic systematic path, and determining a share of risk of variability associated with the cash flow paths is associated with at least one of a lender, a guarantor, and investors. The method further includes determining whether to consolidate an interest in the financial asset in the financial statements of the party based on the primary beneficiary determination.

BRIEF DESCRIPTION OF THE DRAWINGS

The exemplary embodiments will hereafter be described with reference to the accompanying drawings, wherein like numerals denote like elements.

DETAILED DESCRIPTION

Figure 1:
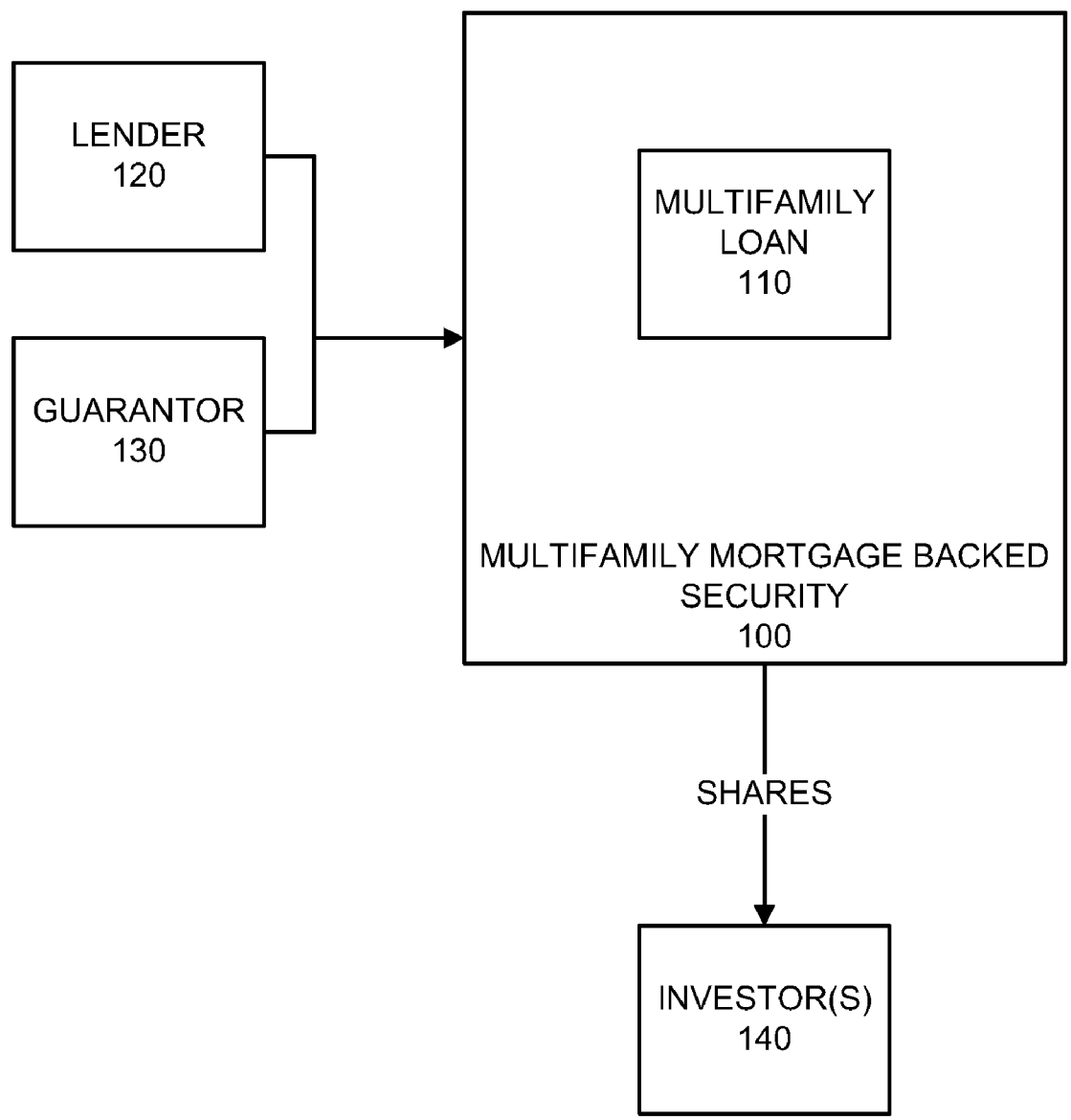
FIG. 1 is an illustration representative of a plurality of variable interest entity holders having interests in a financial instrument, each interest being associated with systematic (i.e. sometimes referred to as "systemic risk") and idiosyncratic risk, according to an embodiment.

Referring to FIG. 1, an illustration representative of a plurality of parties 120-140 having variable interests in a financial instrument such as a multifamily mortgage backed security (MF MBS) 100 is shown, according to an exemplary embodiment. The interest may be associated with both systemic and idiosyncratic risk.

A multifamily mortgage is a mortgage product related to a loan of funds used to buy a multifamily property. The mortgage product allows the borrower to purchase the multifamily property and pay for the multifamily property over time, while also ensuring that the lender is repaid. The mortgage product may be associated with a series of payments including repayment of the loan funds and interest that has accrued based on the amount of the outstanding amount of the loan funds. If the loan is paid off early, a prepayment premium may be assessed.

A multifamily mortgage backed security (MF MBS) 100 is a security backed by one or more multifamily mortgages. For purposes of providing an example, it is assumed in discussion of FIGS. 1-5 that the MF MBS 100 is backed by a single mortgage. A security is an interest ownership in a trust collateralized by one or more mortgages. This ownership is represented in definitive or book-entry certificate form and can be bought, traded, sold, or pledged. Principal and interest payments from the individual mortgage loan or loans may be grouped and paid out to the MBS security holders. These payments may be guaranteed by the guarantor 130, guaranteeing timely payment of the principal and interest regardless of events that occur to the underlying mortgage loan or loans.

A variable interest entity is a Mortgage Backed Security (MBS) trust; the guarantor, lender and investors are variable interest entity holders. Among the parties 120-140 sharing the risk of variability associated with the MF MBS 100, there is a strong negative correlation between a share of variability associated with the guarantor 130 and the share of variability associated with the investors 140. For example, the higher the guarantor 130 share of the variability, the lower the investor 140 share of the variability. According to an embodiment, the guarantor 130 share of the variability may alternatively be owned entirely by the lender 120, a third party guarantor, and/or shared between the two entities.

In order to determine whether an entity is required to consolidate MF MBS 100 in their financial statements, the entity must determine whether they are the primary beneficiary of the security. To determine whether an entity is the primary beneficiary, the variability risk associated with that entity is examined.

Figure 2:
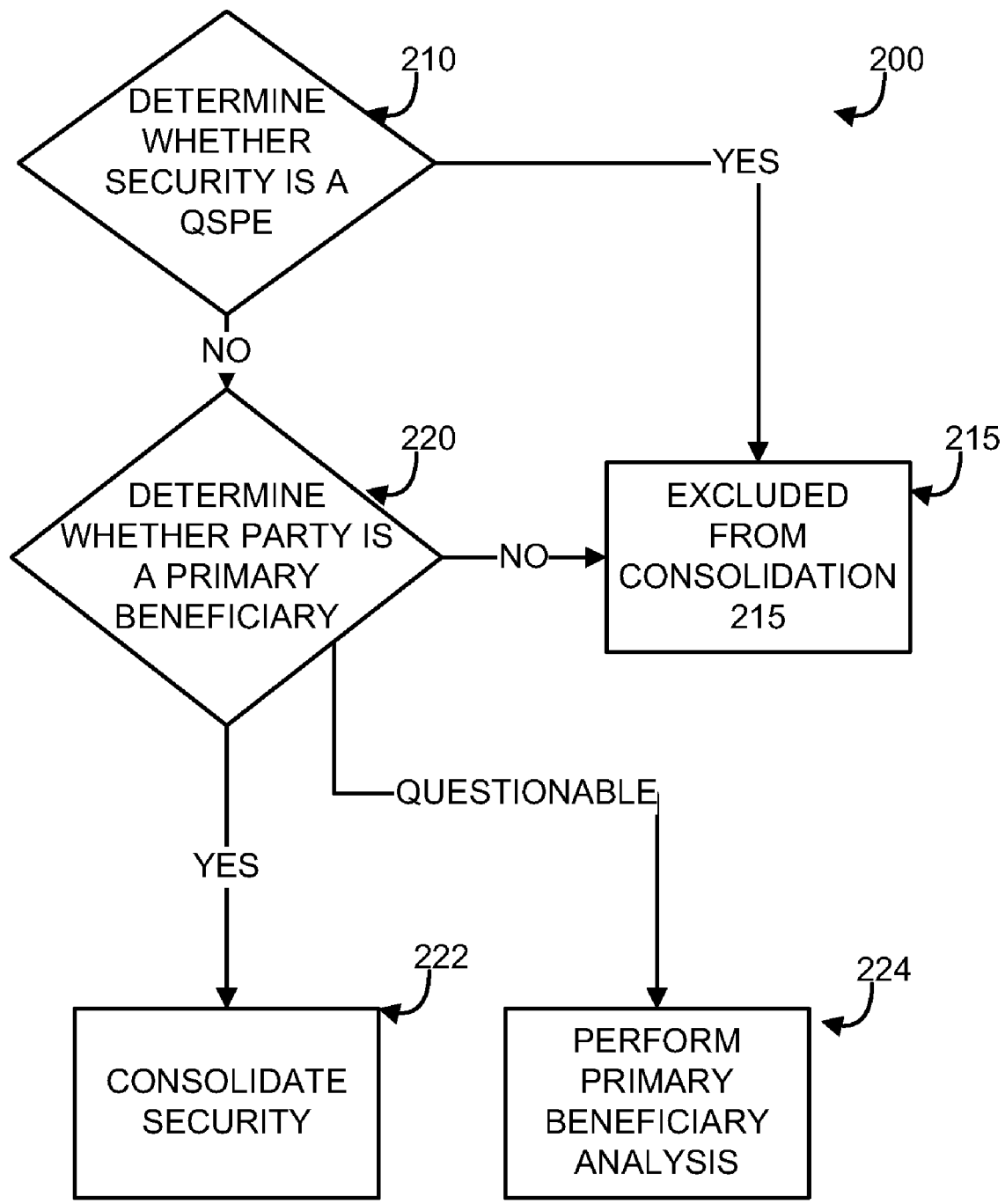
FIG. 2 is a flowchart illustrating a method for determining whether a variable interest entity holder should consolidate its interest in a security based on the status of the entity and a idiosyncratic analysis of risk associated with the cash flows generated by the security, according to an embodiment.

Referring now to FIG. 2, a flowchart illustrating a qualitative method 200 for determining whether a variable interest entity should consolidate a security based on the status of the entity and a quantitative analysis of risk associated with the cash flows generated by the security is shown, according to an exemplary embodiment. The method is used to determine which MBS investments require quantitative assessment by applying a series of qualitative filters to a complete population of MBS investments.

In a step 210, a determination is made whether the multifamily security qualifies as a Qualified Special Purpose Entity (QSPE). A QSPE is defined according to a two part test, relating to the ownership of the trust and whether or not the investment can be classified as a Guaranteed Mortgage security. If so, the security is excluded from consideration for quantitative analysis in a step 215.

If not, in a step 220, a determination is made whether guarantor 130, or any other party sharing the variability risk, is the primary beneficiary. An entity may either be clearly the primary beneficiary, in which case the security is to be consolidated in a step 222, not the primary beneficiary, in which case the security is excluded from consideration for quantitative analysis in step 215, or potentially the primary beneficiary, in which case a primary beneficiary risk analysis is performed in a step 224 using a loan performance calculator.

Figure 3:
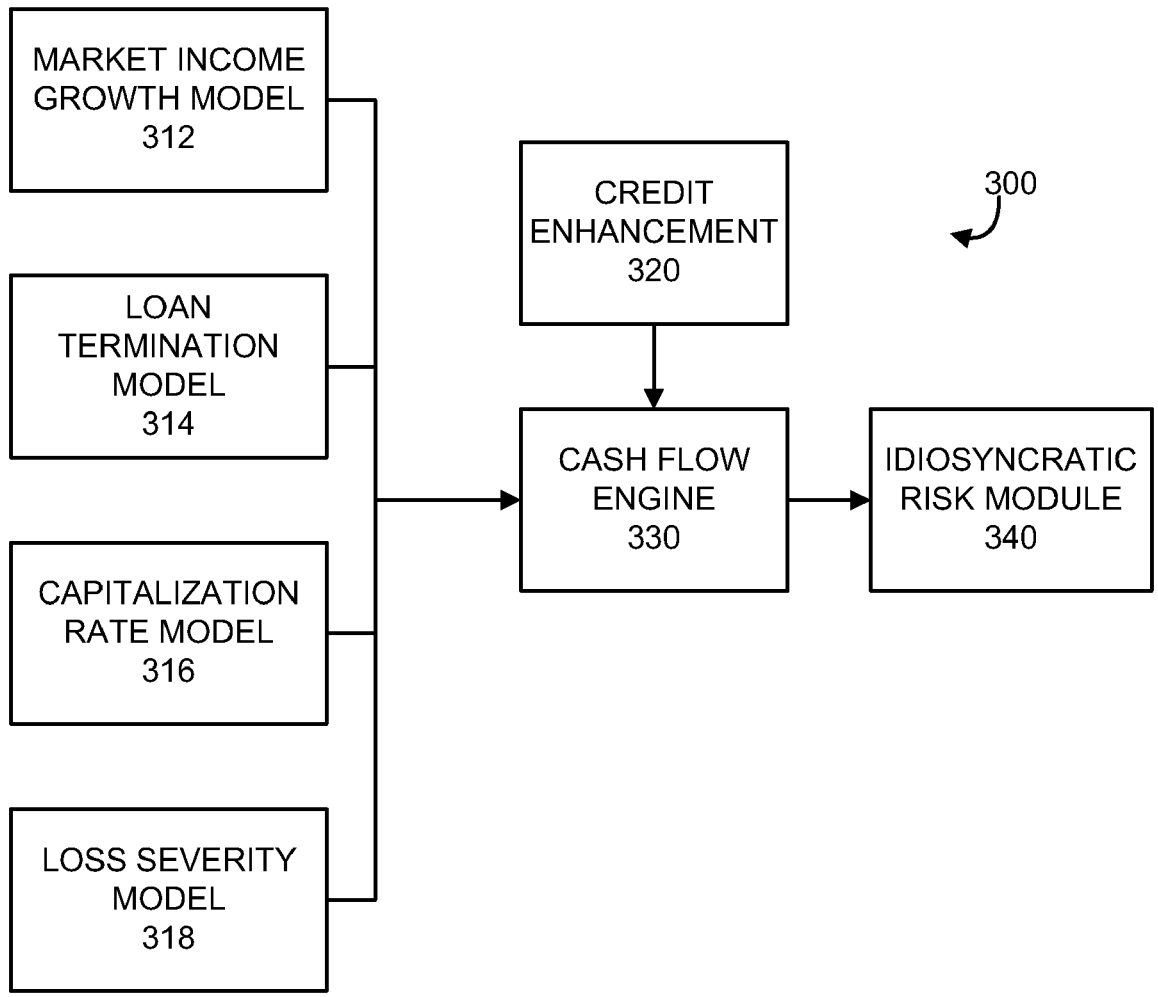
FIG. 3 is a loan performance calculator including an idiosyncratic risk module and configured to predict cash flows for each loan in a financial instrument, according to an embodiment

Referring to FIG. 3, a loan performance calculator 300 including an idiosyncratic risk module 340 and configured to predict cash flows for each loan in a mortgage backed security is shown, according to an exemplary embodiment. Loan performance calculator 300 includes a market growth income model 312, a loan termination model 314, a capitalization rate model 316, a loss severity model 318, a credit enhancement engine 320, a cash flow engine 330, and an idiosyncratic risk module 340. Calculator 300 is used to determine a guarantor 130 or other entity should consolidate on its balance sheet a trust that issued securities based on its guaranty position and/or its ownership position of a security.

The component models 312-318 are used in the generation of loan-level cash flows for a large number of economic scenarios for both MBS and Real Estate Mortgage Investment Conduit (REMIC) securities. The number of economic scenarios can vary from hundreds to thousands, although 300 could be used in one embodiment. Market income growth model 312 simulates effective gross income at the national level to net operating income along simulation paths. Net operating income is used to calculate debt service coverage ratio and, along with capitalization rate simulations, property value along simulations paths. Loan termination model 314 calculates loan-level loss severities for defaulted loans (before credit enhancements) from stochastic inputs along simulation paths. Capitalization rate model 316 simulates multifamily property capitalization rates, defined as the ratio of Net Operating Income to the value of the underlying property. Capitalization rates are used to calculate multifamily property values along simulation paths, which are a component in determining the mark-to-market loan-to-value ratio in loan termination model 314 and loss severity model 318. Loss severity model 318 calculates loan-level loss severities for defaulted loans, before credit enhancements, from stochastic inputs along simulation paths.

Credit enhancement engine 320 captures the impact of loss-sharing agreements on loss levels for each party in such an agreement, i.e., which would generate cash flows in loss situations.

Cash flow engine 330 is configured to generate a plurality of projected cash flow based on one or more loans backing the multifamily mortgage backed security 100. The cash flow attributable to the guarantor 130, investors 140, and lender 120 can be determined after the generation of the idiosyncratic risk paths. The required cash flows may be configured to represent a predetermined number of unique and discrete cash flow scenarios for a loan. The number of cash flows may be selected based on a type of analysis to be performed, the type of loan being predicted, etc. The prediction of cash flows provide an indication of the systemic risk associate for the loans.

Each discrete cash flow may be configured to represent one of four conditions including foreclosure, delinquency or related modification, prepayment, and active (having none of the first three conditions). Cash flows for fees, losses, prepayment income, and principal and interest may be calculated using the average loan balance for the year in which they would occur. The cash flows generated by engine 330 are representative of the systemic risk associated with the MBS. The cash flows may be represented as plurality of default/prepayment curves for the loans.

Cash flow engine 330 is configured to generate a plurality of default/prepayment curves as described above. However, since the majority of multifamily MBS 100 is backed by only one loan (as has been assumed for this example), the default/prepayment curves generated by the main cash flow engine 310 may underestimate the idiosyncratic risk.

Idiosyncratic risk is the risk that cash flow variation attributable to a small pool size that can be underestimated by a pool-level model. The variability calculation required by FIN 46 measures the variability of each path from the mean across all paths. Therefore, path dependent loss volatility becomes more important and may cause a deviation from the risk calculated by cash flow engine 330 along any one particular path. This aspect becomes more important for multifamily MBS 100, which is typically backed by only one loan, multifamily loan 110. If multifamily loan 110 were to default, 100% of the loan pool underlying MF MBS 100 defaults. The loss on this pool of one loan comprises the loss severity given the default. However, for cash flow engine 330, configured for pool-level prepayment and default, credit losses along a given path are calculated as the default probability multiplied by the severity, causing an understatement of the credit losses volatility.

To prevent this underestimation of idiosyncratic risk, loan performance calculator 300 includes a idiosyncratic risk module 340 that converts the set of default/prepayment curves defined by cash flow engine 330 into a predetermined number of occurrences, which, at an aggregated level, mimic the default/prepayment curve from a systemic risk model taking idiosyncratic risk into account.

Table 1, included below, provides a comparison of the impact of idiosyncratic risk versus systematic risk on the variability calculation. The variability calculation used for the table is for a designated underwritten security loan profile using a combination of engine 330 with idiosyncratic risk module 340.

TABLE 1

Comparison of FIN 46 Variability Calculation Using Different Models

| Model | Guarantor | Investor | Lender | Total |
|---|---|---|---|---|
| Systematic Risk Model w/o Idiosyncratic Risk Module | | | | |
| Avg. PV CF of All Paths | 196,488 | 7,965,301 | 133,876 | $8,295,665 |
| Avg. Deviation of Unfavorable Paths | 14,313 | 418,325 | 8,248 | 440,886 |
| Avg. FIN 46 Variability | 3.2% | 94.9% | 1.9% | 100% |
| 1SR Path with Idiosyncratic Risk Module | | | | |
| Avg. PV CF of All Paths | 202,542 | 7,755,749 | 139,389 | $8,097,680 |
| Avg. Deviation of Unfavorable Paths | 15,791 | 22,782 | 5,936 | 44,509 |
| Avg. FIN 46 Variability | 35.5% | 51.2% | 13.3% | 100% |
| 4 SR Paths with Idiosyncratic Risk Module | | | | |
| Avg. PV CF of All Paths | 190,954 | 7,957,066 | 135,909 | $8,283,930 |
| Avg. Deviation of Unfavorable Paths | 31,086 | 194,007 | 10,120 | 235,213 |
| Avg. FIN 46 Variability | 13.2% | 82.5% | 4.3% | 100% |

Table 1 demonstrates that idiosyncratic risk can have a larger impact on the share of volatility owned by the guarantor 130 compared to the other variable interest entity holders. The share is greater since guarantor 130 is in a second loss position absorbing any uncovered loss by the lender 120. Since the losses on certain paths are generally amplified due to the discrete default occurrence events, the guarantor's portion of the losses is enlarged for these paths.

Using the steps described above, calculator 300 is configured to calculate the net present value of each path for each of the variable interest entity holder. This net present value may be utilized by the downstream variability calculator.

Figure 4:
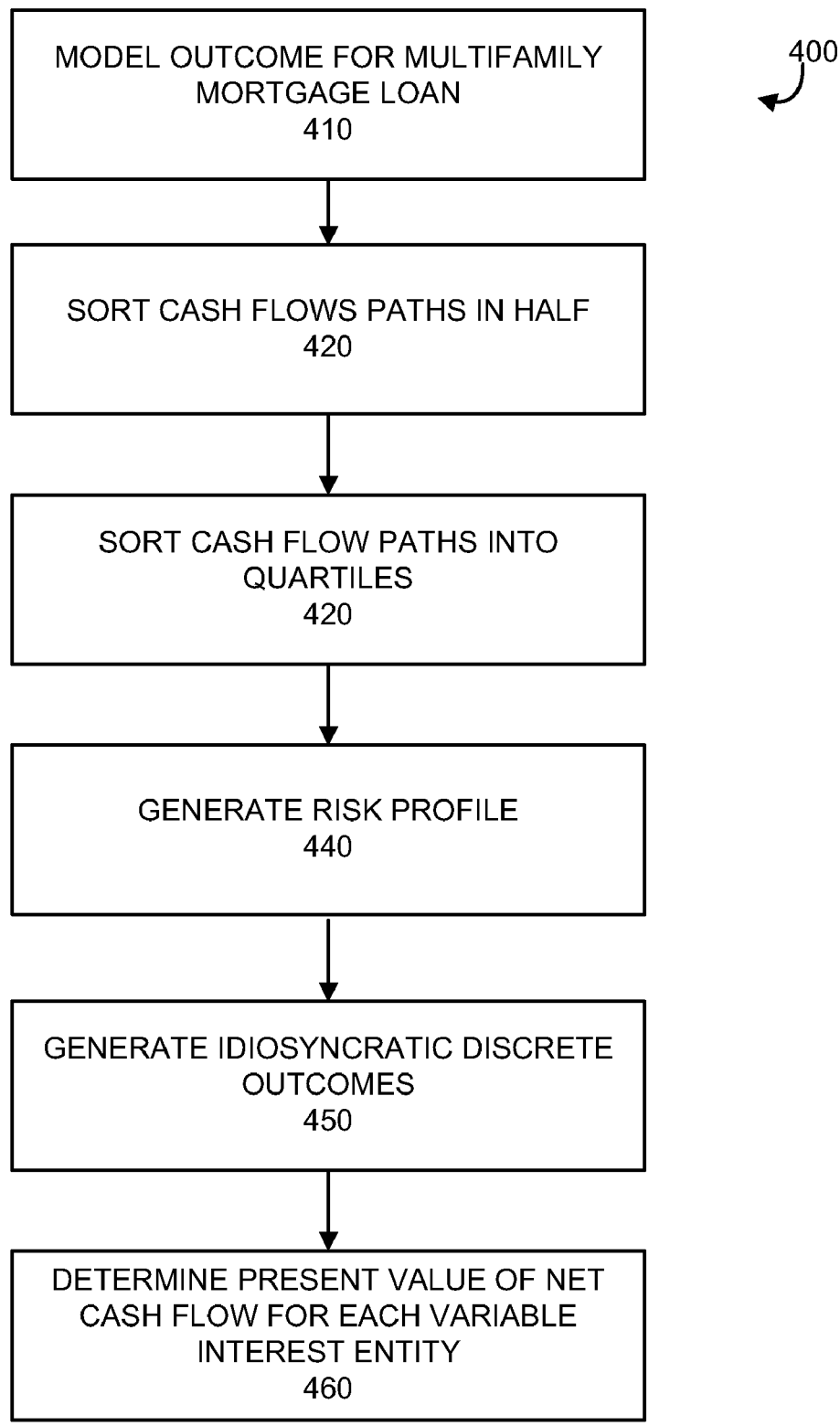
FIG. 4 is a flowchart illustrating a method for adjusting one or more default/prepayment curves representing systemic risk based on idiosyncratic risk, according to an embodiment.

Referring now to FIG. 4, while the idiosyncratic risk is significant for a small pool mortgage backed security, cash flow variation due to systematic risk must still be taken into account. The loan performance calculator 300 combines the systematic risk and idiosyncratic risk factors in the analysis utilizing a method described hereinbelow for selecting four potential outcomes.

Idiosyncratic risk module 330 uses four of the 300 cash flow scenarios generated by cash flow engine 330 to capture systematic risk. These four cash flow scenarios are selected such that each represent a high/low cumulative prepayment and a high/low cumulative losses scenario. The information in each cash flow scenario is used to define the probability of occurrence for each potential outcome for a loan, including 1) default due to delinquency/modification in time t; 2) default due to REO/pre-foreclosure in time t; 3) prepayment in time t; and 4) active to maturity. The sum of the probability of occurrence across all potential outcomes in 100%.

In a first step 410, cash flow engine 330, in combination with models 312-318 and engine 320, is utilized to model the outcome for the loan backing MF MBS 100 for 300 different paths. This model outcome may be represented as a plurality of default/prepayment curves.

In a step 420, the 300 paths are sorted by cumulative lifetime losses to divide the 300 paths into two groups with 150 paths in each group, a lower loss group and a higher loss group. Each of the two subgroups is then sorted by cumulative lifetime prepayment rate to identify $25^{th}$ and $75^{th}$ percentile paths in a step 430. Using this method, calculator 300 incorporates credit risk (default and severity) and interest rate risk (prepayment frequency) into the model.

In a step 440, for each of the four paths above, a risk profile including both systematic risk and idiosyncratic risk is generated. The profile can include probabilities for each year associated with a delinquent/modification default occurrence, a REO/pre-foreclosure sale default occurrence, a prepayment occurrence, etc. The profile can also include present valued cash flows to one or more of the parties 120-140 for each year associated with a delinquent/modification default occurrence, a REO/pre-foreclosure sale default occurrence, a prepayment occurrence, and an active to maturity occurrence.

For each cash flow, the stochastic one-month treasury curve data may be used to calculate the present value factor for each year. The present value factors may be multiplied by the yearly cash flows contained within each of the discrete scenarios for the three parties 120-140. A total for each of the three parties is calculated which represents the sum of the individual yearly discounted cash flows. This process may be repeated for each discrete scenario and for each of the four paths.

Cash flow engine 330 may be further configured to assign a probability of occurrence to each of the potential cash flow scenarios. Each probability may be specific to the particular path.

Together, the four potential outcomes fully specify the probability-weighted cash flow profile for the life of the loan. Idiosyncratic risk is captured by randomly drawing a number of discrete outcomes from each of the four potential outcomes. Since a systematic risk path represents the expected outcome for a large pool of loans, the default and prepayment curves of each systematic risk path should be closely replicated across the corresponding set of the large number of discrete outcomes.

In a step 450, for each of the four paths, IRM 340 creates 1,000 idiosyncratic discrete outcomes. These outcomes may be randomly created to generate a total of 4,000 paths for each of the parties 120-140. Within a group of 1,000 idiosyncratic risk paths for a single systematic risk path, the idiosyncratic risk paths are generated using the random number generation method. Each path is defined by a random number that the model draws according to a uniform distribution between zero and one. The paths are defined/generated such that the probabilities of Real Estate Owned (REO)/pre-foreclosure default, delinquent/modification default, prepayment and activity for the life of the loan from systematic risk path add up to 100%, the size of the sub-bucket for each possible occurrence is defined by the modeled probability of that occurrence on the systematic risk path, the sub-bucket where a random number falls determines an idiosyncratic risk path with the occurrence representing that sub-bucket, and overall, the total number of occurrence for REO/pre-foreclosure default, delinquent/modification default and prepayment across 1,000 paths replicates the default curves and the prepayment curve for that systematic path.

Path generation is implemented based on discrete events. For example, there may be 41 discrete outcomes for a 10 year loan. These events are "multiplied" by the four factors from the systematic risk modules to create 4000 paths. For each factor, using a unique seed value to generate a random number between zero and one. If the number lies in a probability interval of a period in the prepayment, delinquent, or REO unconditional probability vector, that event is set to one for the path. For all preceding periods, the loan is assume to be active. This iterative calculation results in an intermediate vector for each of the 1000 paths for a loan. The intermediate vectors can be display in tabular form, as shown below in Table 2.

TABLE 2

| Path | Year | Active Probability | Prepayment Probability | Delinquent Probability | REO Probability |
|---|---|---|---|---|---|
| 1 | 1 | 1 | 0 | 0 | 0 |
| 1 | 2 | 1 | 0 | 0 | 0 |
| 1 | 3 | 0 | 1 | 0 | 0 |
| 2 | 1 | 1 | 0 | 0 | 0 |
| ... | ... | ... | ... | ... | ... |
| 2 | 5 | 0 | 0 | 1 | 0 |
| ... | ... | ... | ... | ... | ... |
| 1000 | 10 | 1 | 0 | 0 | 0 |

This yields, for each path i, period pd, four discrete event probabilities below. Since these are discrete event probabilities, they can only be either 0 or 1.

1) Active: p_A(i, pd)
2) Prepay: p_P(i, pd)
3) Delinquent/modification: p_D(i, pd)
4) Preforeclosure/REO: p_R(i, pd) where i=1, ..., 1000, and pd=1, ..., 30.

Figure 5:
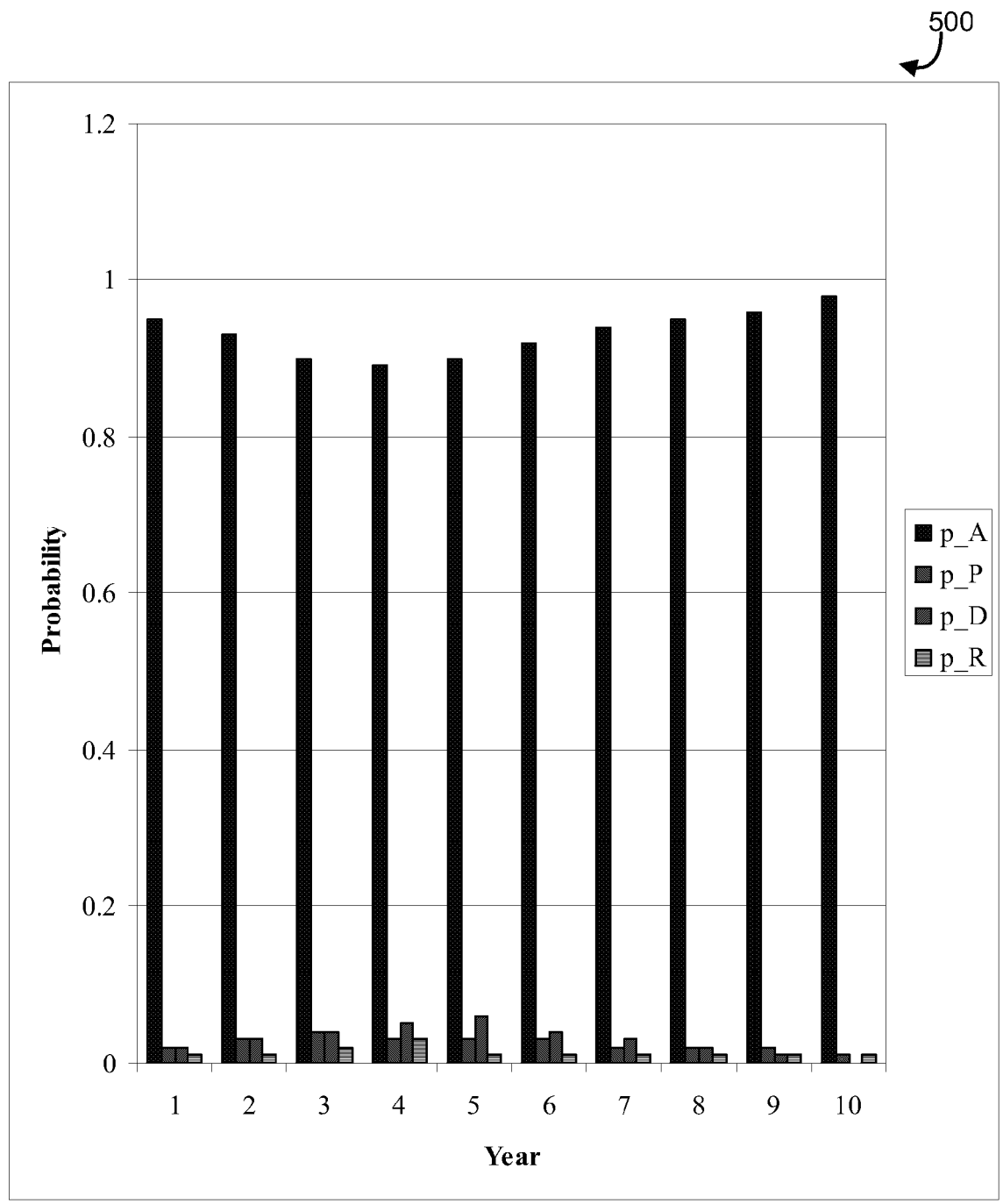
FIG. 5 is a chart illustrating probability of occurrence for each of four events for each of the term years of a loan, according to an embodiment.

For a given period, the sum of any probability (p_A, p_P, p_D, or p_R) over all the path, should be approximately the same as the probability for that event in that period in the probability vector from the cash flow engine 330. Referring now, to FIG. 5, a chart 500 illustrating exemplary probabilities of occurrence for each of the four events for each of the 10 years of a hypothetical loan.

For each of the 1000 paths, a cash flow path can be generate by multiplying the intermediate vector with the corresponding cash flows from the cash flow engine 330. Eleven cash flows may be generated for each path, per period including:

$$(Gfee\ revenue, Guarantor)[pd] = \{p\_A[pd] + (p\_D[pd] + p\_R[pd] + p\_P[pd])/2\} * (Gfee\ revenue, Guarantor)[pd] \quad 1.$$

$$(Gfee\ revenue, Lender)[pd] = \{p\_A[pd] + (p\_D[pd] + p\_R[pd] + p\_P[pd])/2\} * (Gfee\ revenue, Lender)[pd] \quad 2.$$

$$(REOLoss, Guarantor)[pd] = p\_R[pd] * (REOLoss, Guarantor)[pd] \quad 3.$$

$$(REOLoss, Lender)[pd] = p\_R[pd] * (REOLoss, Lender)[pd] \quad 4.$$

$$(DelLoss, Guarantor)[pd] = p\_D[pd] * (DelLoss, Guarantor)[pd] \quad 5.$$

$$(DelLoss, Lender)[pd] = p\_D[pd] * (DelLoss, Lender)[pd] \quad 6.$$

$$(Prepay\ premium, Guarantor)[pd] = p\_P[pd] * (Prepay\ premium, Guarantor)[pd] \quad 7.$$

$$(Prepay\ premium, Lender)[pd] = p\_P[pd] * (Prepay\ premium, Lender)[pd] \quad 8.$$

$$(Prepay\ premium, Investor)[pd] = p\_P[pd] * (Prepay\ premium, Investor)[pd] \quad 9.$$

$$(\text{Principal,Investor})[pd] = (p\_A[pd] + p\_D[pd] + p\_R[pd] + p\_P[pd]) * (\text{Principal,Investor})[pd] \qquad 10.$$

$$(\text{Net Interest,Investor})[pd] = \{p\_A[pd] + (p\_D[pd] + p\_R[pd] + p\_P[pd])/2\} * (\text{Net Interest,Investor})[pd] \qquad 11.$$

where the right hand side cash flows are received from cash flow engine 330 and are reflective of systematic risk.

In a step 460, engine 330 determines the present value of net cash flow for each of the parties 120-140 for 4,000 paths. Cash flows generated from IRM 340 are at the loan level. However, since the above-described FIN 46 test is performed at the security level, engine 330 aggregates the cash flows across all loans in the same security before providing the output. Further, each path may have multiple loans. The cash flow for all loans is aggregated for downstream processing. For this aggregation, the idiosyncratic risk path for one loan is added to a different idiosyncratic risk path of a second loan through a path shuffling step.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network 10 or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

It should also be apparent that it is also possible to construct data processing systems which do not incorporate the advantages described herein in connection with the data processing system, or which also incorporate additional advantages not described herein.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations. Further, although various figures depict a series of steps which are performed sequentially, the steps shown in such figures generally need not be performed in any particular order. For example, some of the steps may be performed essentially simultaneously. Additionally, some steps shown may be performed repetitively with particular ones of the steps being performed more frequently than others. Alternatively, it may be desirable in some situations to perform steps in a different order than shown.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer system comprising a storage medium and a processor which executes engine instructions, the engine instructions comprising: a Monte Carlo simulation engine executed by the processor and configured to perform a primary beneficiary test to determine whether a variable interest entity holder is a primary beneficiary of a financial instrument collateralized by cash flows associated with one or more loans for multifamily housing, the Monte Carlo simulation engine including: a cash flow engine executed by the processor and configured to generate a set of default and/or prepayment curves representing one or more discrete cash flow scenarios for the one or more loans for the financial instrument, the default and/or prepayment curves representative of systemic risk associated with the financial instrument; the cash flow engine configured to generate the set of default and/or prepayment curves based on results received from: a market income growth module configured to determine an effective gross income at a national level to determine a net operating income and use the determined net operating income to calculate a debt service coverage ratio, capitalization rate simulations and property values along the default and/or prepayment curves; a loan termination module configured to calculate loan-level loss severities for defaulted loans from non deterministic inputs; a capitalization rate module that calculates multifamily property capitalization rates based on a ratio between a net operating income and a value of an underlying property; an idiosyncratic risk module executed by the processor and configured to convert the set of default and/or prepayment curves defined by the cash flow engine into a number of occurrences, which, at an aggregated level, mimic the default and/or prepayment curve from a systemic risk model; wherein the Monte Carlo simulation engine is configured to determine the primary beneficiary based on the results from the cash flow engine and the idiosyncratic risk module; wherein the one or more discrete cash flow scenarios includes foreclosure, delinquency or modification, prepayment and active to maturity; wherein the variable interest entity holder comprises a lender, investor, and guarantor; wherein the idiosyncratic risk module is configured to allocate greater risk to the guarantor compared to the risk allocated to the guarantor under the systemic risk associated with the financial instrument when the investor is in a first position of loss and the guarantor is in a second position of loss; wherein the idiosyncratic risk module determines a share of risk of variability associated with the cash flows being associated with at least one of the lender, investor and guarantor.

2. The system of claim 1, wherein the idiosyncratic risk module is configured to convert the set of default and/or prepayment curves defined by the cash flow engine into a number of occurrences based on the one or more cash flow scenarios.

3. The system of claim 1, wherein the idiosyncratic module is configured to sort the one or more discrete cash flow scenarios by using the cumulative lifetime losses which incorporates the credit risk and configured to create subgroups of the cash flow scenarios.

4. The system of claim 3, wherein the idiosyncratic module is configured to sort the subgroups of cash flow scenarios by using the cumulative lifetime prepayment rate which incorporate the interest rate risk and identifying a plurality of percentiles.

5. The system of claim 1, wherein the idiosyncratic module generates a risk profile that includes both the systemic risk and the idiosyncratic risk.

6. The system of claim 5, wherein the risk profile includes probabilities for each year associated with the delinquent and/or modification default occurrence, the Real Estate Owned and/or pre-foreclosure sale occurrence, the prepayment occurrence, and the active occurrence.

7. The system of claim 1, wherein the idiosyncratic module creates a plurality of idiosyncratic paths using a plurality of idiosyncratic discrete outcomes for each cash flow scenario.

8. The system of claim 7, wherein the idiosyncratic discrete paths are generated using a random number generation method.

9. The system of claim 8, wherein the idiosyncratic discrete paths are generated such that the probabilities of occurrence of Real Estate Owned and/or pre-foreclosure default, delinquent and/or modification default, prepayment and activity for the life of the loan mimic the curves for a systematic path.

10. The system in claim 1, further comprising a credit enhancement engine configured to provide data to the cash flow engine regarding a change in the cash flow due to a loss-sharing agreement between the lender, investor and guarantor; wherein the idiosyncratic risk module is configured to create 1000 idiosyncratic discrete outcomes for each one of the one or more cash flow scenarios and determine a probability for the occurrence of each idiosyncratic discrete outcome; wherein the simulation engine determines the present value of a net cash flow for each variable interest entity holder and determines an aggregate cash flow for the one or more loans for multifamily housing.

11. The system in claim 1, wherein the share of risk of variability associated with the guarantor and the share of variability associated with the investor has a negative correlation.

12. A method implemented using a computer readable storage medium for determining whether an idiosyncratic risk adjusted variability for a first party associated with a plurality of cash flows is large enough in comparison to other interested parties such that an asset or a an asset identified by the Committee on Uniform Security Identification Procedures needs to be consolidated under regulatory accounting principles, comprising: electronically generating using a processor a set of default and/or prepayment curves representing one or more discrete cash flow scenarios for one or more loans for a financial instrument, the default and/or prepayment curves representative of systemic risk associated with the financial instrument collateralized by cash flows associated with loans for multifamily housing; electronically determining using the processor an idiosyncratic risk associated with the one or more loans for the financial instrument; and electronically converting using the processor the set of default and/or prepayment curves defined by a cash flow engine based on the idiosyncratic risk associated with the one or more loans for the financial instrument; electronically calculating using a cash flow engine the set of default and/or prepayment curves based on results received from: electronically calculating using a market income growth module a market income growth using an effective gross income at a national level to determine a net operating income and the determined net operating income is used to electronically calculate using a market income growth module a debt service coverage ratio, capitalization rate simulations and property values along the default and/or prepayment curves; electronically calculating using a loan termination module loan-level loss severities for defaulted loans from non deterministic inputs; electronically determining using a capitalization rate module a multifamily property capitalization rate based on a ratio between net operating income and a value of an underlying property; electronically generating using the processor a risk profile comprising both the systematic risk and the idiosyncratic risk; wherein the profile further includes probabilities for each year associated with a delinquent and/or default occurrence, a real estate owned and/or pre-foreclosure sale occurrence, a prepayment occurrence, and active occurrence; electronically determining a share of risk variability associated with the cash flow scenarios that is correlated with at least one of the lender, investor and guarantor; wherein the first party is a guarantor of the one or more loans and the other interested parties are a lender, and an investor; wherein electronically determining the idiosyncratic risk includes allocating a greater risk to a guarantor compared to the risk allocated to the guarantor under systematic risk because the investor is in a first position of loss and the guarantor is in a second position of loss.

13. The method of claim 12, converting further comprises converting the set of default and/or prepayment curves defined by the cash flow engine into a number of occurrences based on probabilities associated with each potential outcome for a loan.

14. The method of claim 13, wherein each of the potential outcomes comprises at least one of default due to delinquent and/or modification, default due to Real Estate Owned and/or pre-foreclosure, prepaying and active to maturity.

15. The method of claim 12, further comprises sorting the cash flow scenarios by using the cumulative lifetime losses and creating subgroups comprising a lower loss group and a higher loss group.

16. The method of claim 15, further comprises sorting the subgroups the cumulative lifetime prepayment rate by identifying 25th and 75th percentile paths.

17. The method of claim 12, further comprising generating a plurality of idiosyncratic paths using a plurality of idiosyncratic discrete outcomes for each flow scenario; wherein each of the idiosyncratic discrete outcomes are generated using a random number generation method.

18. The method of claim 17, wherein the aggregate of the idiosyncratic discrete paths mimic the systematic paths for the probabilities of occurrence of Real Estate Owned and/or pre-foreclosure default, delinquent and/or modification default, prepayment and activity for the life of the loan.

19. A method for accounting for idiosyncratic risk in a qualitative and quantitative assessment of a financial instrument to determine a share of total risk owned by a party having an interest in the financial instrument, comprising: electronically determining using a processor whether the party having an interest in the financial instrument is the primary beneficiary of the financial instrument by converting the set of default and/or prepayment curves into a number of occurrences, which, at an aggregated level, mimic the default and/or prepayment curve from a systemic risk model, the determination including: electronically generating using the processor a plurality of systemic cash flows representing systemic risk associated with the multifamily mortgage backed security; identifying four systemic cash flow paths using a cash flow engine from the plurality of systemic cash flows; wherein the cash flow engine is configured to electronically generate a set of default and/or prepayment curves based on results received from: a market income growth module configured to determine the effective gross income at a national level to determine a net operating income and the determined net operating income is used to calculate a debt service coverage ratio, capitalization rate simulations and property values along the default and/or prepayment curves; loan termination module configured to calculate loan-level loss severities for defaulted loans from non deterministic inputs; capitalization rate module that calculates multifamily property capitalization rates based on a ratio between a net operating income and a value of an underlying property; electronically generating using the processor a plurality of idiosyncratic risk paths for each of the four systemic cash flow paths, where an aggregation of the idiosyncratic risk paths replicates the default curves and the prepayment curve for the systemic risk paths; determining a share of risk variability correlated with the cash flow paths of at least one of a lender, a guarantor, and investors; electronically determining using the processor whether to consolidate an interest in the financial asset in the financial statements of the party based on the primary beneficiary determination; and wherein electronically generating the idiosyncratic risk paths includes allocating a greater risk to a guarantor compared to the risk allocated to the guarantor under systemic risk paths when the investor is in a first position of loss and the guarantor is in a second position of loss; wherein the share of risk of variability associated with the guarantor and the share of variability associated with the investor has a strongly negative correlation.

20. The method of claim 19, wherein the four systemic cash flow paths are a delinquent and/or modification default occurrence, a Real Estate Owned and/or pre-foreclosure sale occurrence, a prepayment occurrence, and active occurrence.

* * * * *